United States Patent [19]

Sundt

[11] 4,005,515
[45] Feb. 1, 1977

[54] METHOD OF MANUFACTURING A CLOSED CHANNEL DISK FOR A GAS TURBINE ENGINE

[75] Inventor: Cornelius V. Sundt, Windsor, Conn.

[73] Assignee: United Technologies Corporation, Hartford, Conn.

[22] Filed: Mar. 11, 1976

[21] Appl. No.: 666,111

Related U.S. Application Data

[62] Division of Ser. No. 554,806, March 3, 1975, Pat. No. 3,970,412.

[52] U.S. Cl. ............................ 29/156.8 R; 29/445
[51] Int. Cl.² ................. B23P 15/04; B23P 13/00
[58] Field of Search .............. 29/156.8 R, 156.8 B, 29/445, DIG. 26; 416/219, 220, 221, 95, 244 A, 213, 193 A

[56] References Cited

UNITED STATES PATENTS

| | | | |
|---|---|---|---|
| 3,034,763 | 5/1962 | Rowley | 416/220 |
| 3,297,301 | 1/1967 | Petrie et al. | 416/213 |
| 3,309,058 | 3/1967 | Blackhurst et al. | 416/220 |
| 3,393,862 | 7/1968 | Harrison | 416/220 |
| 3,700,353 | 10/1972 | Ortolano | 416/219 |
| 3,890,685 | 6/1975 | Rünte et al. | 29/156.8 H |

FOREIGN PATENTS OR APPLICATIONS

| | | | |
|---|---|---|---|
| 1,428,230 | 1/1969 | Germany | 416/220 |
| 751,740 | 7/1956 | United Kingdom | 29/156.8 R |
| 905,582 | 9/1962 | United Kingdom | 416/220 |

Primary Examiner—C.W. Lanham
Assistant Examiner—Daniel C. Crane
Attorney, Agent, or Firm—Robert C. Walker

[57] ABSTRACT

A disk having a closed channel construction and which is especially suited for supporting the rotating blades of a gas turbine engine is disclosed. In one embodiment, the disk supports the fan blades of a turbofan engine which extend radially therefrom. The disk structurally includes an upsteam web, a downstream web and a plurality of arcuate plugs disposed in end to end relationship between the webs to form a toroidal type structure having a substantially rectangular cross section. The disk is contoured to provide a level of torsional and bending stiffness which limits the most critical stage vibratory frequencies to values above the engine operating range while limiting the maximum value of the disk hoop stress during operation to a level below the durability limits of the disk material utilized. A method for making the disk is further disclosed.

3 Claims, 3 Drawing Figures

METHOD OF MANUFACTURING A CLOSED CHANNEL DISK FOR A GAS TURBINE ENGINE

This is a division of application Ser. No. 554,806, filed Mar. 3, 1975, now U.S. Pat. No. 3,970,412.

BACKGROUND OF THE INVENTION

1. Field of the Invention

This invention relates to gas turbine engines and more particularly to apparatus for supporting the fan blades of a turbofan engine.

2. Description of the Prior Art

The turbofan engine is the type of power plant most widely used on large aircraft today. In the turbofan engine as distinguished from a turbojet engine, a portion of the working medium gases is pumped axially through one or more compression stages and is exhausted directly to the atmosphere without passing through the core portion of the engine. The compression stages which exhaust directly to the atmosphere are called fan stages and are generally positioned at the forward end of the engine. The ratio of the air flowing through the fan stages to air flowing through the core portion of the engine is referred to as the bypass ratio. The bypass ratio may be a different value for each individual engine model according to the performance requirements for that power plant. In all turbofan engines, however, the fan stages make a substantial thrust contribution of between 30 and 75 percent to the total engine thrust at take-off with the actual contribution depending principally upon the bypass ratio.

The size and weight of the fan stages varies proportionately with the bypass ratio. In one typical engine, the JT9D turbofan engine manufactured by Pratt and Whitney Aircraft, a Division of United Aircraft Corporation, a single fan stage with large area flow path accommodates flow at a bypass ratio of approximately 5. Although the blades and the disk which comprise the fan stage of the JT9D engine are fabricated from titanium, the blades weigh collectively 450 pounds and the disk weighs 470 pounds. Most turbofan engines in commercial service today produce proportionately high fan thrust at takeoff and have fan disks which correspond in size to the JT9D disk. Such a massive disk is required to distribute the disk hoop stress which is generated as the blades and disk are rotated at speeds in excess of 3200 revolutions per minute during operation of the engine. Additionally, the disk is sized to have adequate torsional and bending stiffness to resist deflection under the most critical vibratory excitations.

When compared to a turbojet engine operating at the same thrust level, one of the most attractive features of the turbofan engine is its relatively low level of noise generation. This low level of noise generation is made possible by reductions in the strength of the shear turbulence between the exhausted gases and the ambient medium. To increase the bypass ratio additional kinetic energy is removed from the core gas stream to drive the fan stages. Resultantly, the exhaust gas velocity of the core stream is diminished and a reduced level of shear turbulence obtains.

As engines having larger bypass ratios are designed and the size of the fan components is increased, significant performance increases can be achieved if the weight of the fan disk is reduced without sacrificing structural support for the blades mounted thereon.

SUMMARY OF THE INVENTION

A primary object of the present invention is to provide support for the blades of a gas turbine engine.

In accordance with the present invention a disk which supports the blades in at least one stage of a gas turbine engine has a closed channel construction; the closed channel disk is made by machining a circumferential channel into the outer periphery of a disk shaped member to form an upstream and a downstream web, disposing a plurality of arcuate plugs in end to end relationship between the upstream and downstream webs at the periphery of the disk to form a toroidal type structure having a substantially rectangular cross section, attaching the arcuate plugs to the upstream and downstream webs, and machining a plurality of blade retention slots across the periphery of the disk through the upstream and downstream webs and through the arcuate plugs disposed therebetween.

A principal feature in one embodiment of the present invention is the bond region between the webs and the arcuate plugs which is isolated from the disk hoop stress by machining the blade retaining slots to a depth which is below the inner circumferential surfaces of the arcuate plugs. Another important feature is the ratio of the radial length of the webs to the axial distance between the upstream and downstream webs which is varied to provide a level of torsional and bending stiffness which limits the vibratory deflection of the blades during operation of the engine.

A principal advantage of the present invention is the substantially reduced weight of the disk made possible by the web-type construction. Concomitantly, the shaft thickness of a gas turbine engine incorporating the reduced weight disk can be correspondingly reduced while maintaining the same critical rotor speed.

The foregoing and other objects, features and advantages of the present invention will become more apparent in the light of the following detailed description of the preferred embodiments thereof as illustrated in the accompanying drawing.

DESCRIPTION OF THE PREFERRED EMBODIMENT

Figure 1:
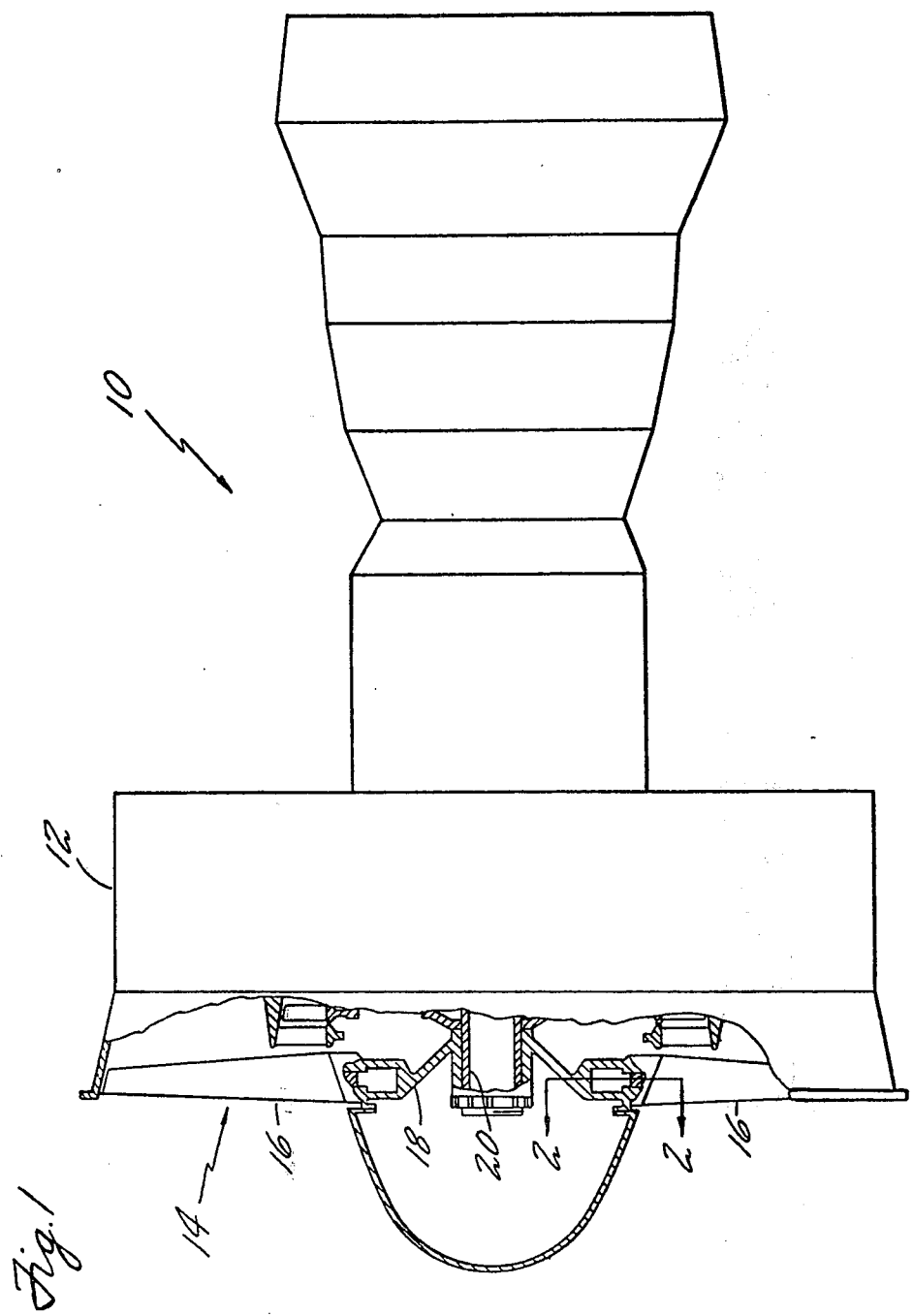
FIG. 1 is a simplified side view of a turbofan engine having a partially broken away section which shows a portion of the fan assembly in cross section.
Figure 2:
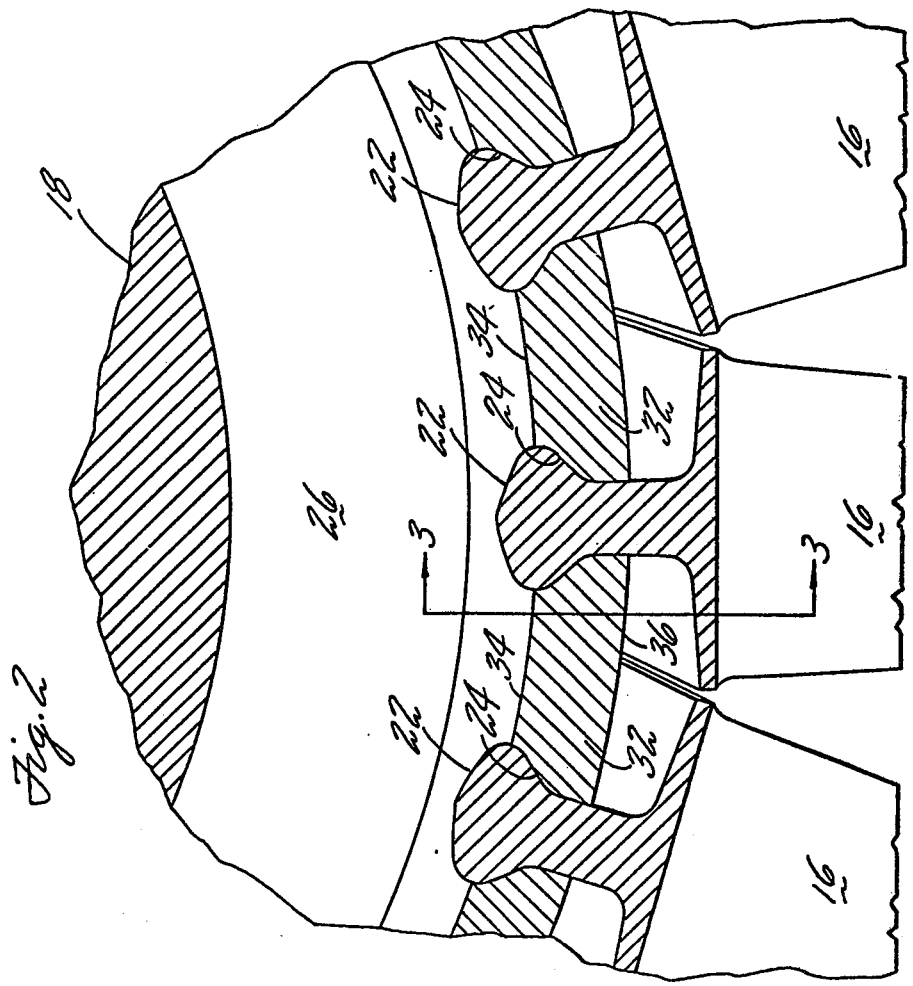
FIG. 2 is a sectional view taken along the line 2—2 as shown in FIG. 1.
Figure 3:
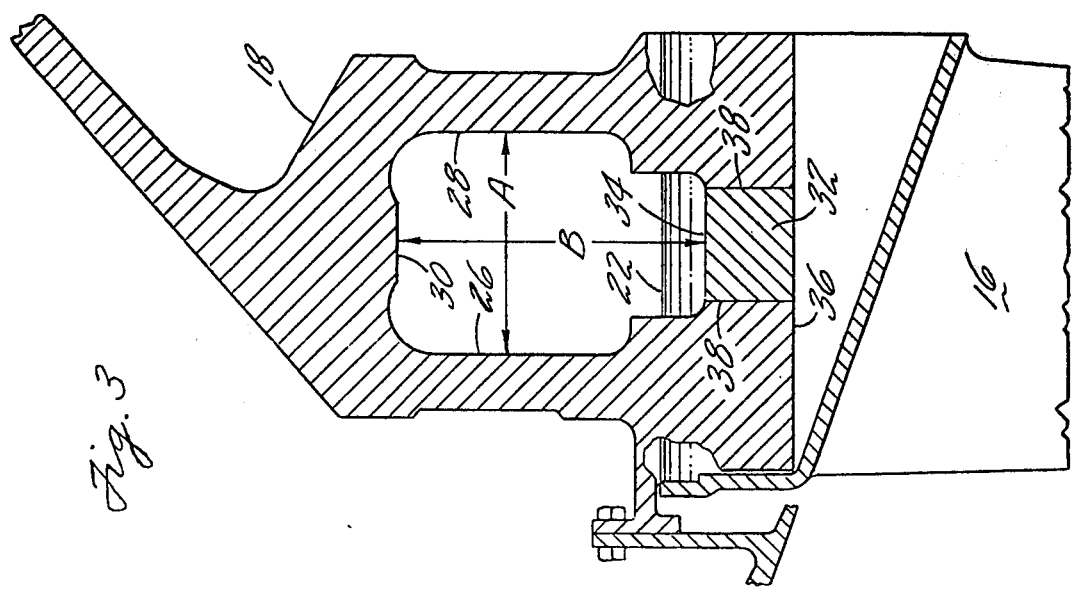
FIG. 3 is a sectional view taken along the line 3—3 as shown in FIG. 2.

A simplified side view of a turbofan engine 10 having a fan case 12 which is partially broken away to reveal in cross section part of a fan assembly 14 is shown in FIG. 1. The fan assembly includes a plurality of fan blades 16 which is attached to a fan disk 18. The inner portion of the disk is attached to a shaft 20 of an engine rotor assembly. As is shown in FIG. 2 each fan blade 16 has a root section 22 which engages a corresponding blade slot 24 in the disk 18. As is shown in FIG. 3, the fan disk 18 comprises an upstream web 26, a downstream web 28 and a base portion 30. An arcuate plug 32 having an inner circumferential surface 34 joins the upstream web to the downstream web at the periphery 36 of the disk.

The fan disk is a massive structure for supporting a multiplicity of blades. In the JT9D turbofan engine referred to above 46 blades which weigh approximately 10 pounds each are supported by the disk at rotational speeds in excess of 3200 revolutions per minute. As each blade is thrust radially outward by centrifugal forces during operation of the engine, the blades collectively generate hoop stresses within the disk. The maximum hoop stress at any one point is held to an acceptable value by providing an adequate material cross sectional area.

In addition to the material cross sectional area requirement, the disk must have sufficient torsional and bending stiffness to limit the most critical stage vibratory frequencies to values above the operating range of the engine. Under critical vibratory conditions highly excited sectors of the disk deflect in the upstream and downstream axial directions to produce both bending and torsional stresses in the disk material. Severe and often destructive bending stresses are produced in the blades as the blades are forced to follow the distorted disk. In conventional constructions, the axial thickness and cross sectional area of a solid disk are increased to provide the required stiffness. The increased area, added for torsional and bending stiffness, exceeds the area required to distribute the hoop stress and represents excessive weight which is eliminated by more judicious use of the disk material in accordance with the present invention.

In the embodiment shown in FIG. 3 a minimum cross sectional area is provided which will reduce the maximum disk hoop stress to an acceptable value. The minimum disk area is then contoured to provide a structure having the desired torsional and bending stiffness. The box-type structure including the upstream web 26 and the downstream web 28 as shown in FIG. 3 has the required stiffness. The upstream and downstream webs are spaced apart by an axial distance (A) and extend over a radial length (B) as shown in FIG. 3. In the JT9D construction referred to above, a ratio of the axial distance to the radial length (A/B) of approximately 0.7 is preferred and a ratio within the range 0.4 and 1.0 is acceptable for most equivalent constructions. Although, it appears that a ratio greater than 1.0 would improve bending stiffness, the axial distance (A) is limited by the width of the blade root which is individually sized in each engine for optimum strength and weight of the blade.

Even through the solid fan disk of most former constructions is fabricated from titanium, the disk weight and, accordingly, the engine weight are substantially reduced by incorporating the closed channel disk of the present invention. In the JT9D and comparably sized engines the disk weight is reduced by approximately 100 pounds. As a side benefit, the disk weight reduction is complemented by corresponding reductions in supporting components such as the rotor shaft which may be decreased in material thickness while maintaining an equivalent critical speed.

The fan disk 18 is made by first machining a circumferential channel into the outer periphery of a disk shaped member to form an element having an upstream web 26 and a downstream web 28 at its periphery. Two or more arcuate plugs 32 are inserted in end to end relationship into the channel between the upstream and downstream webs at the periphery of the disk and are attached to the webs at that location to form a toroidal type structure having a substantially rectangular cross section. In one embodiment the arcuate plugs are attached to the upstream and downstream webs by welding at the bond areas 38 as shown in FIG. 3, although diffusion bonding, brazing or other attaching methods may be effectively utilized. Although mechanical attaching means such as bolts or rivets generally add weight to the disk assembly, mechanical means may be suitable for joining the arcuate plugs to the upstream and downstream webs in some embodiments. The attached arcuate plugs increase the stiffness of the disk and the resistance to axial deflection under vibratory conditions.

As is shown in FIG. 2, the blade slots 24 are machined into the periphery 36 of the disk 18 to a depth which is radially inward of the circumferential surface 34 of the plugs 32. Accordingly, the welds or bonds joining the plugs to the upstream and downstream webs of the disk are located beyond the live rim of the disk, in areas free from circumferential stress. Where two or more plugs 34 are utilized the opposing ends of adjacent segments terminate at one of the blade slots 24.

Although the invention has been shown and described with respect to preferred embodiments thereof, it should be understood by those skilled in the art that various changes and omissions in the form and detail thereof may be made therein without departing from the spirit and the scope of the invention.

Having thus described a typical embodiment of my invention, that which I claim as new and desire to secure by Letters Patent of the United States is:

1. A method for making a fan disk for a turbofan engine comprising the steps of:
   machining a circumferential channel into the outer periphery of a disk shaped member to form an element having an upstream web and a downstream web;
   disposing a plurality of arcuate plugs, each of which has an inner circumferential surface, into the channel in end to end relationship to form a toroidal type structure having a substantially rectangular cross section;
   attaching the arcuate plugs to the upstream and downstream web at the periphery of the disk; and
   machining a plurality of slots across the periphery of the disk through the upstream and downstream webs and through one or more arcuate plugs disposed therebetween, the most radially inward portion of each slot extending below the inner circumference of the plug.

2. The invention according to claim 1 wherein the slots extend across the periphery of the disk in an essentially axial direction.

3. The invention according to claim 1 wherein the step of machining a plurality of slots includes the further step of machining one of the slots at each juncture between adjacent arcuate plugs.

* * * * *